Jan. 4, 1966 R. I. GRAY 3,227,973

TRANSFORMER

Filed Jan. 31, 1962 3 Sheets-Sheet 1

INVENTOR
REGINALD I. GRAY

BY O. Baxter Warner
Claude Funkhouser
ATTORNEYS

Jan. 4, 1966

R. I. GRAY 3,227,973

TRANSFORMER

Filed Jan. 31, 1962

3 Sheets-Sheet 2

Jan. 4, 1966 R. I. GRAY 3,227,973

TRANSFORMER

Filed Jan. 31, 1962 3 Sheets-Sheet 3

United States Patent Office 3,227,973

Patented Jan. 4, 1966

3,227,973
TRANSFORMER

Reginald I. Gray, Dahlgren, Va., assignor to Minister of Aviation in Her Majesty's Government of the United Kingdom of Great Britain and Northern Ireland, London, England Filed Jan. 31, 1962, Ser. No. 170,031
8 Claims. (Cl. 333—78)

The present invention relates to a transformer, and more particularly to a low band-pass transformer for reducing to a negligible level the radio-frequency power transmitted.

The instant invention solves the serious problem of damage caused by spurious energies induced in electronic circuits by electrostatic and radio-frequency electromagnetic fields. When used in a compatible A.C. electrical or electronic circuit it reduces to a negligible level the radio-frequency power transmitted at a frequency in the attenuation band without preventing operation at a frequency in the pass-band. This solution is particularly important for providing adequate protection to weapon electro-explosive devices against electromagnetic and electrostatic fields.

It has been the practice to attempt to solve this problem by the use of low-pass non-dissipative electric filters, broad-band attenuators and lossy transmission lines, low-pass dissipative electric filters, conventional transformers, or electromechanical filters such as piezo-electric, magnetostriction, or electromechanical vibrating devices.

The elimination of the hazards of electromagnetic radiation to ordnance requires the protection of the electric firing circuits from randomly induced energies at all frequencies above a nominal frequency in the region of 10 to 100 kilocycles per second.

Low-pass non-dissipative electric filters generally comprise a combination of inductances and capacitors, usually in the form of ladder networks of $\pi$ or T sections. The performance of these filters depends upon their ability to cause appreciable impedance mismatch between generators and loads of specified impedances thereby resulting in purely reflective attenuation. These filters are unacceptable for solving the problem of electromagnetic radiation hazards to ordnance because the generator impedances cannot be specified. At some particular frequencies the load may therefore be matched by its conjugate impedance and the filter then becomes a matching section causing all the available power to be transferred into the load, the weapon electroexplosive device.

Attenuators contain dissipative elements in various combinations of series and/or parallel configuration with the normal design requirement being the broadest possible bandwidth downward to direct current. Distributed equivalent circuits take the form of transmission lines the materials of which produce series and/or parallel losses. Broad-band attenuators are also non-acceptable for the protection of weapon electroexplosive devices because low-pass characteristics are essential. Transmission lines which possess suitable low-pass characteristics and adequate high frequency attenuation could offer a solution, but no satisfactory transmission lines having these characteristics are presently available.

Low-pass dissipative electric filters, are intentionally or unintentionally, a combination of low-pass non-dissipative electric filters and attenuators in which the inductances and capacitors have appreciable loss at high frequencies or in which series and/or parallel resistive elements have been included. These low-pass dissipative electric filters can provide a partial solution to the protection of electroexplosive devices if used under closely controlled conditions. For example, a filter that provides real attenuation at a particular frequency into a low impedence load by the use of a series lossy element, such as a ferrite choke, in which loss is proportional to load current may give a real voltage gain into a high impedance load. Furthermore, at some frequencies any filter may exhibit band-pass effects and may give a net insertion gain if the reflective insertion gain is greater than the dissipative insertion loss.

Conventional lumped circuit filters and attenuators are generally considered unacceptable for the provision of adequate protection against spurious energies induced by electromagnetic and electrostatic fields. Since there is no inherent difference in the design of a loss-less filter and a matching section, that is, they are both impedance transformers, the attenuation or gain achieved by their use is a unique function of the system comprising a generator, a filter or matching section, and a load. Further, the roles of these devices may be interchanged at critical combinations of frequency, generator and load impedances. The foregoing is particularly important in the protection of electroexplosive devices where one is concerned with the Thévenin equivalent generator impedance at the input to the filter. Furthermore, additional band-pass effects often arise in filters as a result of the changes in component impedance with frequency. That is, capacitors often become inductive at certain frequencies, inductances are reduced by self-capacitance effects, and resistors increase their values and become reactive.

While conventional transformers pass power over a wide range of frequencies their normal mode efficiency falls off rapidly at high frequencies because of iron and copper losses. Unfortunately, capacitive coupling between windings causes power transfer at the higher frequencies, particularly in the symmetric, coaxial or "push-push" mode in which the driving voltage appears between lines and shield.

Electromechanical filters normally have very good low frequency band-pass characteristics but suffer several disadvantages in protecting ordnance from harmful spurious energies. They are usually complicated since they must transduce from electrical to mechanical energy and then back again, and they do not always lend themselves to the use of an electromagnetic barrier to prevent through-coupling by spurious modes. Furthermore, as an additional disadvantage, their transient response is not always adequate.

The instant invention accomplishes the reduction of RF power transmitted at a frequency in the attenuation band to a negligible level. This is achieved by the use of a thin metal barrier which separates the primary and secondary coils of a transformer. This electromagnetic barrier also eliminates capacitive coupling between the primary and secondary coils and eliminates the in phase, coaxial or "push-pull" mode of electric coupling through the transformer.

Accordingly, it is an object of the present invention to provide interference protection against suprious energies induced by electromagnetic and electrostatic fields.

Another object is to provide a transformer capable of reducing to a negligible level radio-frequency power transmitted without preventing operation in the pass-band.

A further object of the invention is the provision of a power transformer capable of achieving high attenuation at frequencies outside the pass-band by means of a physical process obeying a regular exponential law.

Still another object is to provide a transformer having no anomalous pass bands due to stray capacitances or other effects in any modes of excitation at high frequencies where the magnetic field attenuation predominates.

Yet another object of the present invention is the provision of a transformer having an integral electromagnetic shield between the windings thereof to give low band-pass performance.

A still further object is the provision of a transformer having an electromagnetic barrier between the primary and secondary coils for RF attenuation above the pass-band.

A yet further object of the invention is the provision of a transformer having an electromagnetic barrier between the primary and secondary coils for eliminating capacitive coupling between the coils and eliminating the in phase, coaxial or "push-pull" mode of electric coupling through the transformer.

Yet a still further object of the invention is to provide a transformer having a low-pass characteristic capable of passing A.C. power into a shielded enclosure without allowing penetration of significant levels of RF power.

Additionally, a still further object of the invention is the provision of a power transformer capable of achieving protection of weapon electroexplosive devices against spurious energies induced in their associated circuits by random electrostatic and electromagnetic fields.

Other objects and many of the attendant advantages of this invention will be readily appreciated as the same becomes better understood by reference to the following detailed description when considered in connection with the accompanying drawings wherein.

Figure 1:
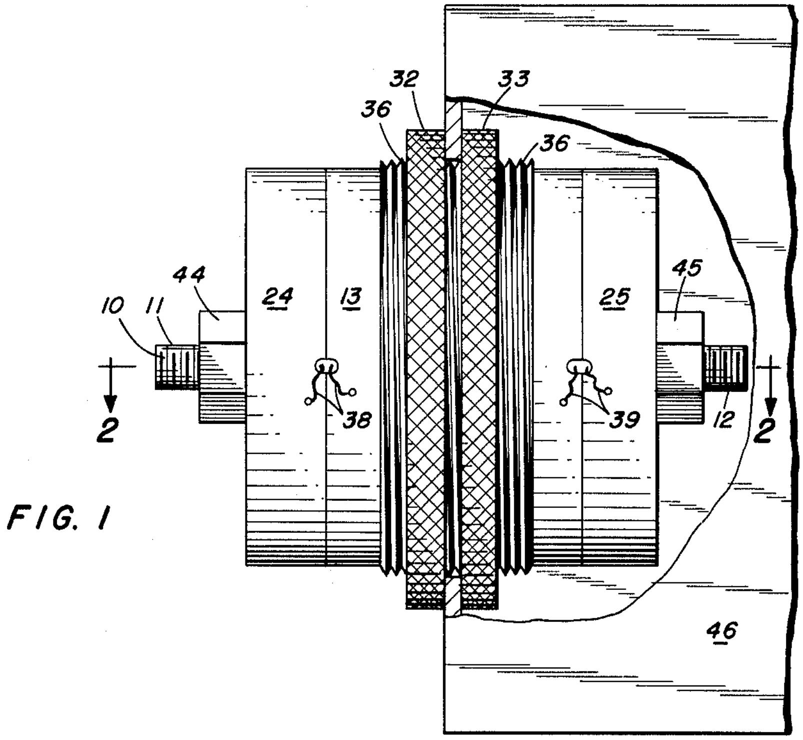
FIG. 1 is a side elevation of an embodiment of the invention mounted in a shield.
Figure 2:
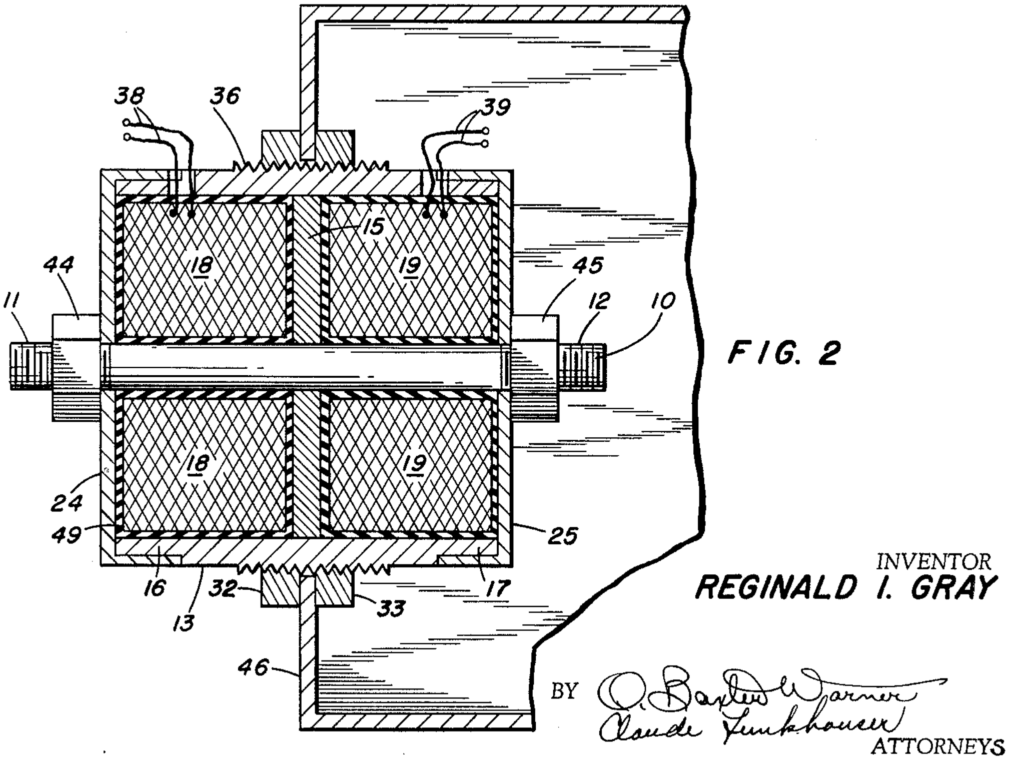
FIG. 2 is a cross sectional view of the invention as illustrated in FIG. 1 taken along lines 2—2.
Figure 3:
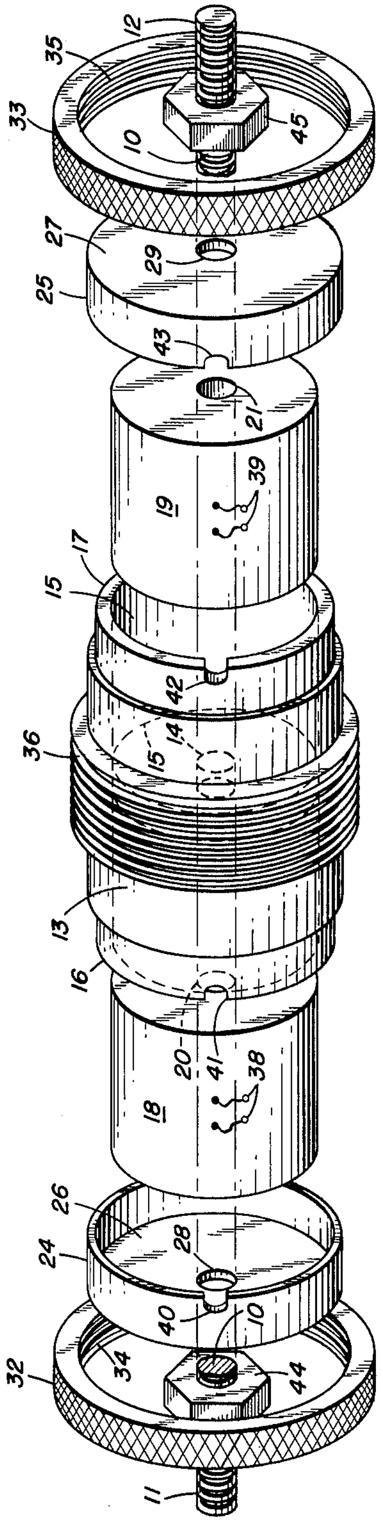
FIG. 3 is an exploded perspective view of the transformer of FIG. 1.

Referring now to the drawings wherein like reference characters designate like or corresponding parts throughout the several views, there is shown in FIGS. 1, 2 and 3 a transformer having a central spindle 10 having suitably threaded extremities 11 and 12. A thick metal barrier 15 which separates the primary coil 18 and secondary coil 19 from each other is brazed to a central cylindrical member 13 of the iron circuit surrounding the coils. The cylindrical metal barrier 15 is brazed to the longitudinal center of member 13 about its circumference and to the spindle 10 which passes through aperture 14 in the metal barrier 15. The metal barrier 15 may, for purposes of example, be comprised of a $\frac{1}{16}$ inch thick brass plate. The iron circuit of the transformer may be of laminated soft iron, or preferably ferrite, but may for purposes of expediency also be comprised of mild steel. The magnetic circuit of the transformer is comprised of a cylindrical member 13 and end caps 24 and 25. The cylindrical member 13 has a central portion thereof which has an outer diameter larger than flange portions 16 and 17 which extend from each side of the central portion. Flange portions 16 and 17 have, however, an internal diameter approximately the same as the central portion of member 13 and extend outwardly in opposite directions from the central portion a sufficient distance to enable insertion of the primary coil 18 within the annular flange 16 and the secondary coil 19 within the annular flange 17. Thus, the primary and secondary coils 18 and 19, respectively, are inserted into communicating juxtaposition with and on opposite sides of the metallic barrier 15. End caps 24 and 25 having an internal diameter slightly larger than external diameters of flanges 16 and 17, respectively, are then inserted thereon so as to encase the primary coils 18 and the secondary coils 19 within the magnetic circuit. End caps 24 and 25 also comprise end plates 26 and 27 for communicating juxtaposition of their internal sides with, respectively, the primary coil 18 and secondary coil 19. Of course, the primary coil 18, secondary coil 19, and end caps 24 and 25 have suitable apertures 20, 21, 28, and 29, respectively, through their central portions for enabling insertion thereof over the central spindle. Central cylindrical member 13 has at its linear center but along its periphery suitable external threads for engaging the internal threads 34 and 35 of rings 32 and 33, respectively. Thereby the transformer may be securely mounted into a suitable shield 46 which would be fixedly maintained between the threaded rings 32 and 33 when threadably engaged upon the external threads 36 of cylindrical member 13. Further, of course, the annular flanges 16 and 17 maintain longitudinal slots extending inwardly from their outer extremities for mating respectively with mating longitudinal slots 40 and 43 in end caps 24 and 25. Through the slot formed by the mating of longitudinal slots 40 and 41 may be inserted the input 38 to the primary coil 18. Likewise, of course, through the longitudinal slot formed by mating slots 42 and 43 may be brought the output 39 from the secondary coil 19 for connection to the electroexplosive device. The entire transformer will be tightly held as a compact unit by the use of nuts 44 and 45 for urging the several members of the transformer together.

It should be understood that suitable insulation such as 49 as seen in FIG. 2 will be employed to insure insulation of the primary coil 18 and secondary coil 19 from the magnetic circuit.

Figure 4:
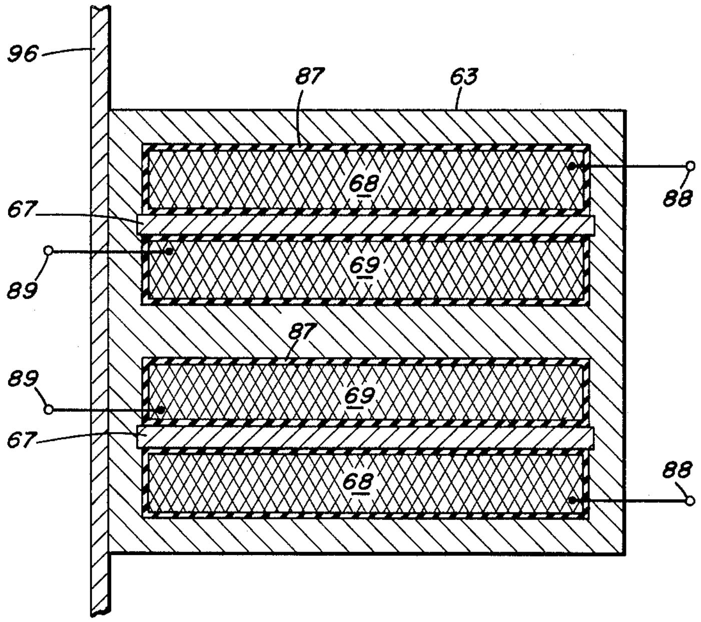
FIG. 4 is a cross sectional view of another embodiment of the invention.

Another embodiment of the invention, as can be best seen in FIG. 4, employs an iron body 63 which may again be laminated soft iron, ferrite, or mild steel, or any other suitable material for completing the magnetic circuit therein. The transformer of FIG. 4 is essentially cylindrical in shape having a central core portion about which is wound the secondary coil 69. Thereafter, with the secondary coil being suitably insulated from the iron body, an electromagnetic shield 67 shaped in the configuration of a thick metal tube is placed over the secondary coil 69 and the primary coil 68 having input leads 88 is wound over the electromagnetic shield 67 but within the periphery of the transformer body 63. Insulation 87 is maintained to suitably insulate the transformer coils from the transformer body 63 and electromagnetic shield 67. Thus, the secondary and primary coils are separated as in FIGS. 1 to 3 with an electromagnetic shield 67. The transformer of FIG. 4 may be suitably mounted to an additional electromagnetic shield 96 for extending the output 89 from the secondary coils through the iron body of the transformer and on through electromagnetic shield 96 to an electroexplosive device. Complete enclosure of the primary and secondary windings as well as the electromagnetic shield within the magnetic circuit can be accomplished through the use of end caps as in FIGS. 1–3.

Figure 5:
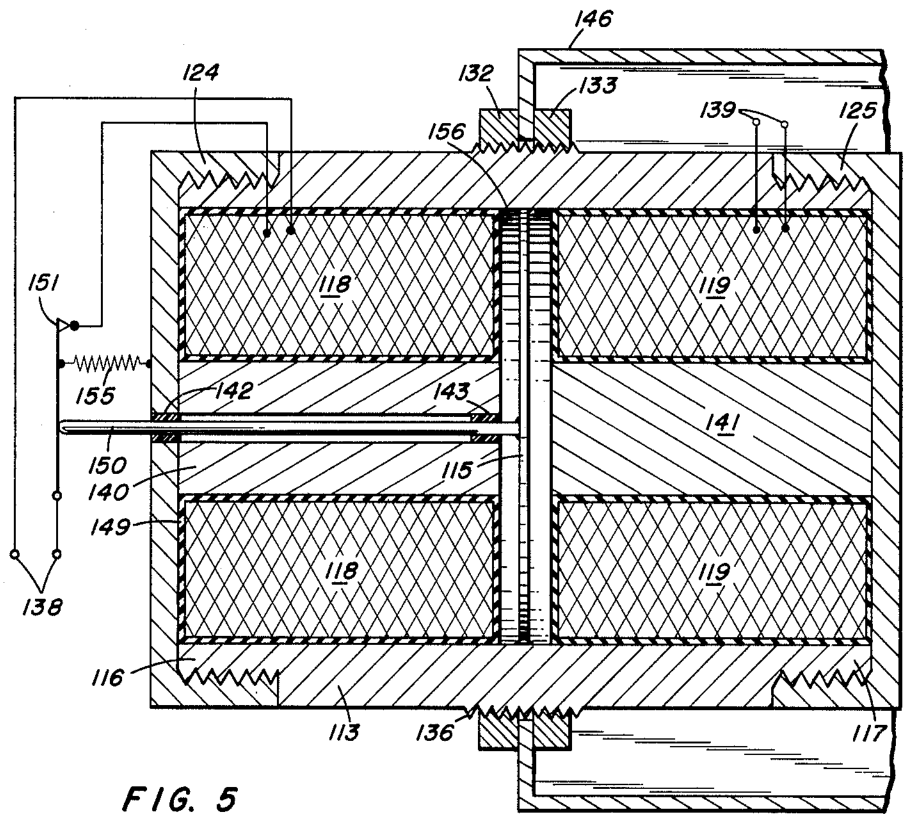
FIG. 5 is a cross sectional view of yet another embodiment of the invention.

Another embodiment, as best seen in FIG. 5, employs the transformer of the invention and enables the use of D.C. as well as A.C. firing potential.

This embodiment employs a thin vibrating diaphragm 115 comprised of a high permeability alloy. The transformer of FIG. 5 is essentially very similar in component assembly to that of FIGS. 1 to 3. That is, rings 132 and 133 are essentially the same as corresponding rings 32 and 33 of FIG. 1 for mounting the transformer by engagement to external threads 136 to a shield 146. Further, the central cylindrical member 113 has a larger outer diameter at its central portion than at its longitudinal extremities 116 and 117. The annular flange members 116 and 117, however, employ external threads for suitable engagement with internal threads on the end caps 124 and 125. Primary coils 118 and 119 with suitable insulation 149 are wound about the transformer core portions 140 and 141. The transformer body and core portions, while preferably constructed of suitable material such as ferrite, may also be constructed from laminated soft iron. The body of the transformer may be either permanently magnetized or nonmagnetized. If the body is non magnetized the diaphragm 115 will be attracted towards the primary coil 118 of the transformer each half-cycle. If the body is permanently magnetized the diaphragm will vibrate at the fundamental frequency. The vibrating diaphragm further functions as a shield as will be explained below. The thin electromagnetic shield diaphragm 115 is fixed about its periphery to the inner diameter of the cylindrical transformer body member 113 and is employed to make and break the input circuit to the transformer so that it can be energized from a D.C. supply (not shown) to be connected at 138. In this manner also the low-pass characteristic is then the combined result of the mechanical and magnetic low-pass effects. To enable the use of a transformer of FIG. 5 with a D.C. input a pin 150 is fixedly connected to the electromagnetic barrier or diaphragm 115 through a central cavity in the core portion 140. Suitable bearing members such as bearings 142 and 143 constructed from a material such as Teflon may be employed to insure smooth reciprocating movement of the pin 150 through the cavity in the ferrite core 140. Any means well known in the art may, however, be employed.

The outer extremity of pin 150 is connected to a spring contact member 151 and the spring contact member is connected to the D.C. input 138 for the primary coil. Movement of pin 150 will cause movement of the contact member 151 thereby opening and closing the input circuit to the primary coil. Any alternative method may, however, be employed to make and break the input supply in response to the vibration of diaphragm 115.

In operation the contact 151 will normally be in a closed position because of the tension spring 155 which urges the contact arm to close. When D.C. is applied the normally closed contact will allow energization of the primary coil 118 which in building up a field will attract the electromagnetic diaphragm member 115 towards the primary coil 118 thereby causing the movement of pin 150 and the opening of the contact 151. This in turn breaks the input circuit and causes the dissipation of the field built up by the primary coil 118. Upon dissipation of the field the spring 155 will again urge the contact 151 into a closed position whereupon the primary coil 118 will again be energized. The initial movement of the diaphragm caused by the energization of the primary coil and the fly back of the diaphragm 115 due to the breakdown of the field will cause the D.C. input to be converted into pulsating D.C. thereby causing transformer action. The natural frequency of resonance of the diaphragm 115 will, of course, be determined by a plurality of parameters but mainly by the parameters of mechanical action and inertia. The parameters may, however, be fixed to be in the center of the pass-band of the transformer. It should, of course, be understood that if the body of the transformer is permanently magnetized it should be so polarized that when the D.C. energizes the primary coil an adding to the existing field will be caused rather than a detraction therefrom. It should, of course, also be understood that while the pin 150 and the spring 155 are connected to the contact 151 they will be suitably electrically insulated therefrom.

The instant invention is based on the concept of interposing an electromagnetic shield between the primary and secondary windings of the transformer, so that the quasi magneto-static can link the winding but, as frequency increases, the magnetic field is progressively attenuated in penetrating this barrier in accordance with the well established law of propagation in metals:

$$\gamma=\alpha+j\beta\simeq(1+j)\sqrt{\frac{\omega\mu\sigma}{2}}$$

where $\gamma$=propagation function
$\alpha$=attenuation function (neper/meter)
$\beta$=phase function (radian/meter)
$\mu$=initial permeability (henry/meter)
$\sigma$=conductivity (mho/meter)
$\omega=2\pi$ frequency in cycles per second from which is derived the equation for "skin depth"

$$\delta=\frac{1}{\alpha}=\frac{1}{\beta}=\sqrt{\frac{2}{\omega\mu\sigma}}$$

meters/neper or radian which is the distance at which both the electric field (E) and the magnetic field (H) are attenuated to a value of $e^{-1}$ of their respective magnitudes at the surface, and it is the distance at which the phase is retarded by one radian. By definition, therefore, the transformer has a low band-pass A.C. characteristic. When the transformer is mounted, as in FIG. 1, it enables A.C. power to be passed into a well shielded enclosure without allowing penetration of significant levels of RF power. The electromagnetic barrier between primary and secondary windings also completely eliminates capacitive coupling between them and eliminates the in phase, coaxial or "push-push" mode of electric coupling through the transformer.

The instant invention is highly advantageous over the use of other A.C. powered devices since it achieves high attenuation above the pass-band by means of a physical process obeying a regular exponential law. There can be no anomalous pass-bands due to stray capacitances or other effects in any modes of excitation at high frequencies where the magnetic field attenuation predominates. Moreover, one modification of the instant invention enables the use of D.C. power and converts it to an A.C. output.

Obviously, many modifications and variations of the present invention are possible in light of the above teachings. It is, therefore, to be understood that within the scope of the appended claims the invention may be practiced otherwise than as specifically described.

What is desired to be secured by Letters Patent of the United States is:

1. A transformer for reducing to a negligible level the radio-frequency power transmitted while allowing operations in the pass-band comprising an elongated core, an electromagnetic barrier fixedly positioned at approximately the linear center of said core, an outer body having a central cylindrical member fixedly positioned at approximately its internal linear center to said electromagnetic barrier, a first end cap for capping a first longitudinal extremity of said central cylindrical member, a second end cap for capping a second longitudial extremity of said central cylindrical member, a primary coil inserted in said central cylindrical member between a first side of said electromagnetic barrier and said first end cap, a secondary coil inserted in said central cylindrical member between a second side of said electromagnetic barrier and said second end cap, means for mounting the transformer into a shielding enclosure, and means for assembling the transformer into a compact unitary assembly whereby radio-frequency power is attenuated and capacitive and coaxial electric coupling are eliminated.

2. A transformer as claimed in claim 1 wherein said electromagnetic barrier, said primary coil, said secondary coil, and said first and second end caps have central cavities extending therethrough along the longitudinal axis of said cylindrical member for insertion on said elongated core.

3. A transformer as claimed in claim 2 wherein said means for assembling the transformer into a compact unitary assembly comprises threaded end portions on the longitudinal extremities of said core and nut means for threadably engaging said threaded end portions to thereby cause compact communicating juxtaposition of said nut means with said end caps and said end caps with said central cylindrical members.

4. A transformer as claimed in claim 3 wherein said means for mounting said transformer into a shielding enclosure comprises external threads along approximately the linear center of said cylindrical member and first and second internally threaded rings for engagement therewith whereby the transformer may be inserted into the side of a shielding enclosure so that a first one of said rings is threadably drawn into communicating juxtaposition with an exterior surface of said shielding enclosure and a second one of said rings is threadably drawn into communicating juxtaposition with an internal side of said enclosure to thereby cause said secondary coil to be held within said shielding enclosure.

5. A transformer for reducing to a negligible level the radio-frequency power transmitted while allowing operation in the pass-band comprising an elongated core; an electromagnetic barrier having a first central aperture therein for insertion on said elongated core; an outer body having a central cylindrical member fixedly positioned at approximately its internal linear center to said electromagnetic barrier having a middle portion, and first and second annular flanges extending in opposite longitudinal directions and having inner diameters substantially equal to the inner diameter of said middle portion and outer diameters less than the outer diameter of said middle portion, a longitudinal slot in each of said first and second annular flanges extending longitudinally from the outer extremities of said first and second annular flanges, a first end cap having a cylindrical portion having an inner diameter greater than the outer diameter of said first annular flange and having a longitudinal slot extending longitudinally from a first extremity of said first end cap cylindrical portion and mating with a longitudinal slot in said first annular flange, and a second end plate over a second extremity of said first end cap cylindrical portion having a second central aperture therein for being slidably engaged on said elongated core and over said first annular flange of said central cylindrical member, a second end cap having a cylindrical portion having an inner diameter greater than the outer diameter of said second annular flange, a longitudinal slot extending longitudinally from a first extremity of said second end cap cylindrical portion and mating with a longitudinal slot in said second annular flange, and a first end plate over a second extremity of said end cap cylindrical portion having a third central aperture therein for being slidably engaged on said elongated core and over said second annular flange of said central cylindrical member; a primary coil having a fourth central aperture through its longitudinal dimension and inserted in said central cylindrical member between a first side of said electromagnetic barrier and said first end cap, a secondary coil having a fifth central aperture through its longitudinal dimension and inserted in said central cylindrical member between a second side of said electromagnetic barrier and said second end cap; threaded end portions on the longitudinal extremities of said elongated core; nut means for threadably engaging said threaded end portions to thereby cause compact communicating juxtaposition of said nut means with said end caps and said end caps with said central cylindrical member; and mounting means having external threads along approximately the linear center of said cylindrical member and first and second internally threaded rings for engagement therewith whereby the transformer may be inserted into the side of a shielding enclosure so that a first one of said rings is threadably drawn into communicating juxtaposition with an exterior surface of said shielding enclosure and a second one of said rings is threadably drawn into communicating juxtaposition with an internal side of said enclosure to thereby cause said secondary coil to be held within said shielding enclosure whereby radio-frequency power is attenuated and capacitive and coaxial electric coupling are eliminated.

6. A transformer for attenuating radio-frequency power comprising an iron circuit having an outer body, a core, a secondary coil wound within said outer body and on said core, a cylindrical electromagnetic shield for insertion within said outer body and over said secondary coil, a primary coil wound within said outer body and on said cylindrical electromagnetic shield, input leads to said primary coil, and output leads from said secondary coil whereby radio-frequency power is attenuated and capacitive and coaxial electric coupling are eliminated.

7. A transformer for reducing to a negligible level the radio-frequency power transmitted while allowing operation in the pass-band comprising a core, an electromagnetic metal barrier fixedly positioned at approximately the linear center of said core, an outer body having a central cylindrical member fixedly positioned at approximately its internal linear center to said electromagnetic barrier, said cylindrical member comprising a middle portion and first and second annular flanges extending in opposite longitudinal directions and having inner diameters substantially equal to the inner diameter of said middle portion and outer diameters less than the outer diameter of said middle portion, a first end cap for capping a first longitudinal extremity of said central cylindrical member, and a second end cap for capping a second longitudinal extremity of said central cylindrical member, said first and second end caps comprising cylindrical portions having inner diameters greater than the outer diameters of said first and second annular flanges and an outer diameter approximately equal to the outer diameter of said middle portion of said central cylindrical member, and end plates over a first extremity of said end cap cylindrical portions for slidably engaging said end caps over the annular flanges of said central cylindrical members, a primary coil inserted in said central cylindrical member between a first side of said electromagnetic barrier and said first end cap, and a secondary coil inserted in said central cylindrical member between a second side of said electromagnetic barrier and said second end cap whereby radio-frequency power is attenuated and capacitive and coaxial electric coupling are eliminated.

8. A transformer for reducing to a negligible level the radio-frequency power transmitted while allowing operation in the pass-band comprising a core, an electromagnetic metal barrier fixedly positioned at approximately the linear center of said core, an outer body having a central cylindrical member fixedly positioned at approximately its internal linear center to said electromagnetic barrier, said cylindrical member comprising a middle portion and first and second annular flanges extending in opposite longitudinal directions and having inner diameters substantially equal to the inner diameter of said middle portion and outer diameters less than the outer diameter of said middle portion, a first end cap for capping a first longitudinal extremity of said cylindrical member, and a second end cap for capping a second longitudinal extremity of said central cylindrical member, said first and second end caps comprising cylindrical portions having inner diameters greater than the outer diameters of said first and second annular flanges and an outer diameter approximately equal to the outer diameter of said middle portion of said central cylindrical member, and end plates over a first extremity of said end cap cylindrical portions for slidably engaging said end caps over the annular flanges of said central cylindrical members, a primary coil inserted in said central cylindrical member between a first side of said electromagnetic barrier and said first end cap, and a secondary coil inserted in said central cylindrical member between a second side of said electromagnetic barrier and said second end cap, said mating annular flanges and end caps each comprising mating longitudinal slots extending longitudinally for allowing entry of the primary coil leads into an aperture formed by the mating slots of said first end cap and said first annular flange and for allowing exit of leads from a secondary coil through an aperture formed by the mating slots of said second end cap and said second annular flange whereby radio-frequency power is attenuated and capacitive and coaxial electric coupling are eliminated.

References Cited by the Examiner

UNITED STATES PATENTS

| | | | |
|---|---|---|---|
| 1,887,713 | 11/1932 | Gunn | 333—71 |
| 2,141,277 | 12/1938 | Nickel | 333—71 |
| 2,222,796 | 11/1940 | Devol | 333—71 |
| 2,413,201 | 12/1946 | Tillman | 333—78 |
| 2,630,560 | 3/1953 | Earl | 333—78 |
| 2,631,193 | 3/1953 | Roberts | 333—78 |
| 2,675,526 | 4/1954 | Friberg | 336—90 |
| 2,838,737 | 6/1958 | Duncan | 333—78 |
| 2,889,522 | 6/1959 | Friberg | 333—78 |
| 2,928,057 | 3/1960 | Jarger | 333—71 |

FOREIGN PATENTS

| | | |
|---|---|---|
| 203,549 | 5/1959 | Austria. |
| 356,803 | 9/1931 | Great Britain. |

HERMAN KARL SAALBACH, *Primary Examiner.*